(12) United States Patent
Kinoshita

(10) Patent No.: US 10,828,631 B2
(45) Date of Patent: *Nov. 10, 2020

(54) HONEYCOMB STRUCTURE

(71) Applicant: NGK INSULATORS, LTD., Nagoya (JP)

(72) Inventor: Takashi Kinoshita, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 176 days.

This patent is subject to a terminal disclaimer.

(21) Appl. No.: 15/926,168

(22) Filed: Mar. 20, 2018

(65) Prior Publication Data

US 2018/0280962 A1    Oct. 4, 2018

(30) Foreign Application Priority Data

Mar. 30, 2017 (JP) .................... 2017-068308

(51) Int. Cl.

| | |
|---|---|
| *B01J 35/04* | (2006.01) |
| *B01D 46/24* | (2006.01) |
| *B01J 35/02* | (2006.01) |
| *C04B 38/00* | (2006.01) |
| *F01N 3/28* | (2006.01) |
| *C04B 111/00* | (2006.01) |

(52) U.S. Cl.

CPC ............ *B01J 35/04* (2013.01); *B01D 46/247* (2013.01); *B01D 46/2429* (2013.01); *B01D 46/2474* (2013.01); *B01J 35/023* (2013.01); *C04B 38/0009* (2013.01); *F01N 3/2828* (2013.01); *B01D 2046/2433* (2013.01); *B01D 2046/2488* (2013.01); *B01D 2046/2492* (2013.01); *C04B 2111/00793* (2013.01); *F01N 2330/34* (2013.01); *F01N 2330/38* (2013.01)

(58) Field of Classification Search
None
See application file for complete search history.

(56) References Cited

U.S. PATENT DOCUMENTS 4,740,408 A * 4/1988 Mochida ................ B01D 46/10
                                                           422/179
6,224,703 B1    5/2001 Yamasaki
(Continued)

FOREIGN PATENT DOCUMENTS

| EP | 2 070 579 B1 | 2/2017 |
|---|---|---|
| JP | S62-266298 A1 | 11/1987 |
| JP | 08238431 A * | 9/1996 |

OTHER PUBLICATIONS

Hydraulic Diameter, Apr. 1, 2012, Neutrium (Year: 2012).*

(Continued)

*Primary Examiner* — Humera N. Sheikh
*Assistant Examiner* — Mary I Omori
(74) *Attorney, Agent, or Firm* — Burr & Brown, PLLC

(57) ABSTRACT

A honeycomb structure includes a pillar-shaped honeycomb structure body having porous partition walls, wherein the partition walls have projecting portions,
in the cells of 10% or more of the plurality of cells, the projecting portions project into the cells, a tip curvature radius R of an apex of each of the projecting portions is from 0.01 to 0.1 mm, side surfaces of the projecting portions are inclined to the surfaces of the partition walls at an inclination angle of 40 to 70°, and a relation of $0.04 \leq H/A \leq 0.4$ is satisfied.

5 Claims, 3 Drawing Sheets

(56) References Cited

U.S. PATENT DOCUMENTS

D835,768 S * 12/2018 Yamaguchi ............... D23/365
2009/0176053 A1 * 7/2009 Miyairi ............... C04B 35/195
428/116

OTHER PUBLICATIONS

Ogawa et al., machine translation of JPH08238431 Abstract and Description, Sep. 17, 1996 (Year: 1996).*
German Office Action (with English translation), German Application No. 10 2018 002 329.0, dated Apr. 29, 2020 (8 pages).

* cited by examiner

HONEYCOMB STRUCTURE

The present application is an application based on JP-2017-068308 filed on Mar. 30, 2017 with Japan Patent Office, the entire contents of which are incorporated herein by reference.

BACKGROUND OF THE INVENTION

Field of the Invention

The present invention relates to a honeycomb structure, and more particularly, it relates to a honeycomb structure which is especially suitably utilizable as a catalyst carrier onto which an exhaust gas purifying catalyst is to be loaded.

Description of the Related Art

In recent years, awareness toward environmental problems has increased in the whole world. Consequently, in fields of technologies in which fuel is burnt to generate power, various technologies have been developed to remove toxic components such as nitrogen oxides from exhaust gases generated during the burning of the fuel. For example, there have been developed various technologies of removing toxic components such as nitrogen oxides from exhaust gases to be emitted from car engines. When the toxic components in the exhaust gases are removed, it is general to cause a chemical reaction in such a toxic component by use of a catalyst, thereby changing the component to another comparatively harmless component. Furthermore, as a catalyst carrier onto which an exhaust gas purifying catalyst is to be loaded, a honeycomb structure is used.

Heretofore, as this honeycomb structure, there has been suggested a honeycomb structure including a honeycomb structure body having porous partition walls which define a plurality of cells to form through channels for a fluid. As the honeycomb structure, for the purpose of increasing a geometric surface area of partition walls, there has been suggested a honeycomb structure in which fins projecting inwardly from the partition walls are disposed (e.g., see Patent Document 1).

[Patent Document 1] JP-A-S62-266298

SUMMARY OF THE INVENTION

In such a honeycomb structure as disclosed in Patent Document 1, a geometric surface area of partition walls can be increased by fins disposed on the partition walls. However, when this honeycomb structure is used as a catalyst carrier, there is the problem that a catalyst is not effectively used.

That is, in such a honeycomb structure as in Patent Document 1, when a surface 5 of a partition wall 1 is coated with a catalyst 30 as shown in FIG. 6, the catalyst easily accumulates in root portions of fins 40. Therefore, an amount of the catalyst is large in these root portions, and the amount of the catalyst decreases in tip portions. In this way, it is not easy to uniformly load the catalyst onto the surfaces of the partition walls including the fins in this manner. Consequently, in the honeycomb structure of Patent Document 1, the catalyst loaded onto the root portions is especially hard to be effectively used, and improvement of a purification performance is hard to be expected from the amount of the catalyst to be loaded. On the other hand, when a large amount of the catalyst is loaded to achieve the improvement of the purification performance, through channels for an exhaust gas narrow as much as the amount of the catalyst, and there is also the problem that pressure loss after the catalyst is loaded rises.

The present invention has been developed in view of such problems of conventional technologies. According to the present invention, there is provided a honeycomb structure which is especially suitably utilizable as a catalyst carrier onto which an exhaust gas purifying catalyst is to be loaded. There is provided the honeycomb structure in which rise of pressure loss is inhibited, a geometric surface area of partition walls is increased, and the catalyst can uniformly be loaded onto the surfaces of the partition walls, so that improvement of a purification performance is expected.

According to the present invention, there is provided a honeycomb structure as follows.

According to a first aspect of the present invention, a honeycomb structure is provided including:

a pillar-shaped honeycomb structure body having porous partition walls arranged to define a plurality of cells extending from a first end face to a second end face to form through channels for a fluid, and a circumferential wall disposed to surround the partition walls, wherein the partition walls have projecting portions projecting to extend into the cells and arranged continuously in an extending direction of the cells, in the cells of 10% or more of the plurality of cells, the projecting portions project into the cells, a tip curvature radius R of an apex of each of the projecting portions is from 0.01 to 0.1 mm, side surfaces of the projecting portions are inclined to the surfaces of the partition walls at an inclination angle of 40 to 70°, and a hydraulic diameter A of each cell and a height H of the projecting portion satisfy a relation of $0.04 \leq H/A \leq 0.4$.

According to a second aspect of the present invention, the honeycomb structure according to the above first aspect is provided, wherein in the partition walls arranged to define the cells, the number of the projecting portions to be disposed per side constituting a peripheral edge of the cell is 3 or less.

According to a third aspect of the present invention, the honeycomb structure according to the above first or second aspects is provided, wherein the projecting portions are disposed in a central portion of the honeycomb structure body excluding a circumferential portion of a region of 5 mm from a circumference of the honeycomb structure body.

According to a fourth aspect of the present invention, the honeycomb structure according to the above first or second aspects is provided, wherein the projecting portions are disposed in the whole region of the honeycomb structure body.

According to a fifth aspect of the present invention, the honeycomb structure according to any one of the above first to fourth aspects is provided, wherein the projecting portions are disposed in an intersecting region where the partition walls of two sides constituting a peripheral edge of the cell intersect.

A honeycomb structure of the present invention has projecting portions arranged to project into cells, and hence, a geometric surface area of partition walls can be increased by the projecting portions. In particular, a tip curvature radius R of an apex of each projecting portion is from 0.01 to 0.1 mm, and hence, a catalyst is also effectively loaded onto tips of the apexes of the projecting portions. Furthermore, side surfaces of the projecting portions are inclined to the surfaces of the partition walls at an inclination angle of 40 to 70°, and hence, catalyst accumulation is hard to occur in roots of the projecting portions. Consequently, in the honeycomb structure of the present invention, the catalyst can uniformly be loaded onto the surfaces of the partition walls including the tips of the apexes of the projecting portions. Therefore, in the present invention, the catalyst loaded onto the honeycomb structure of the present invention is effectively used. Furthermore, in the honeycomb structure of the present invention, a height H of the projecting portion and a hydraulic diameter A of the cell satisfy a relation of $0.04 \leq H/A \leq 0.4$. Therefore, the geometric surface area can effectively be increased, and rise of pressure loss is inhibited.

DESCRIPTION OF THE PREFERRED EMBODIMENTS

Hereinafter, description will specifically be made as to embodiments of the present invention with reference to the drawings. The present invention is not limited to the following embodiments. It should be understood that the following embodiments to which changes, improvements and the like are suitably added on the basis of ordinary knowledge of a person skilled in the art without departing from the gist of the present invention also fall in the scope of the present invention.

Figure 1:
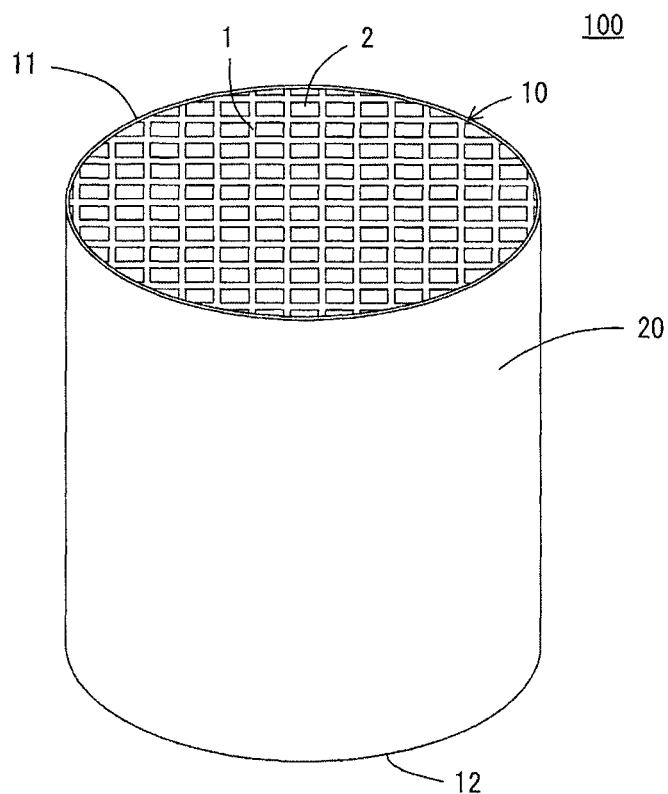
FIG. 1 is a perspective view schematically showing an embodiment of a honeycomb structure of the present invention.
Figure 2:
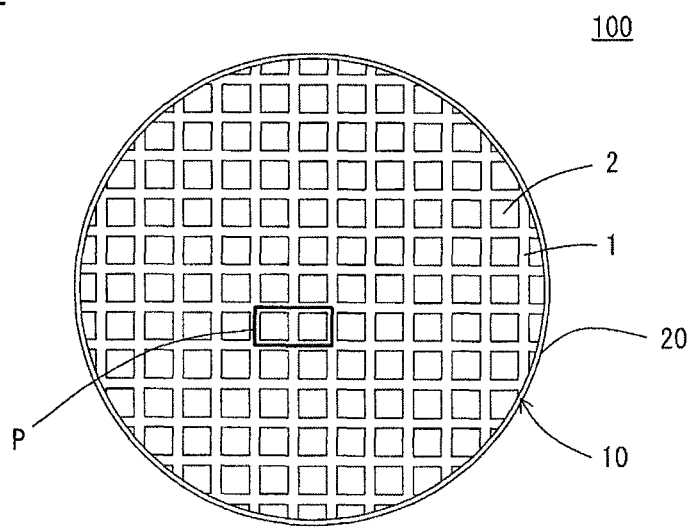
FIG. 2 is a plan view schematically showing an inflow end face of the embodiment of the honeycomb structure of the present invention.
Figure 3:
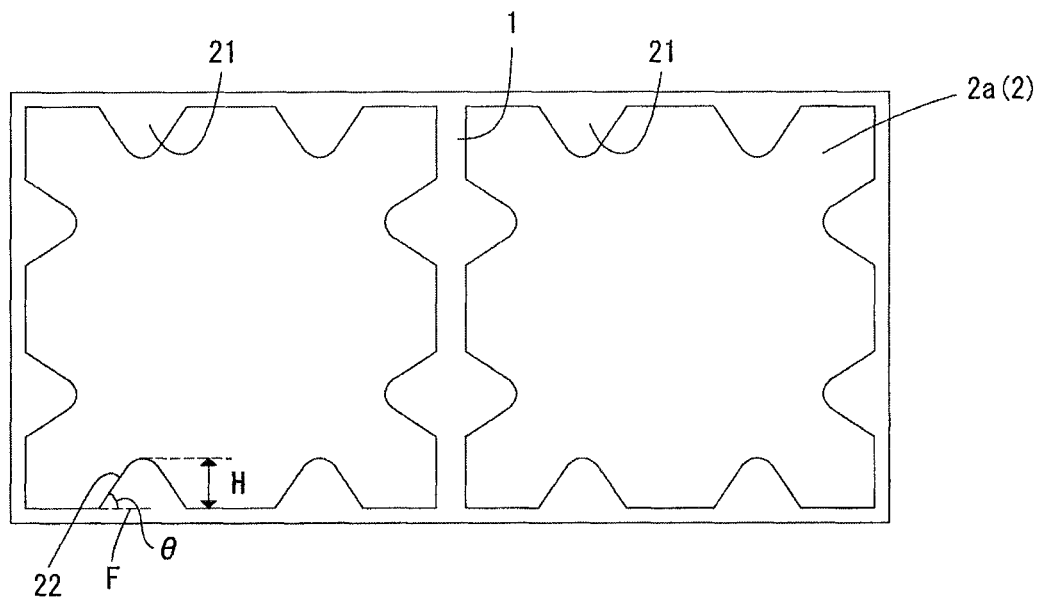
FIG. 3 is a plan view schematically showing an enlarged part (a region P) of the inflow end face shown in FIG. 2.

(1) Honeycomb Structure:

An embodiment of a honeycomb structure of the present invention is a honeycomb structure 100 shown in FIG. 1 to FIG. 3. The honeycomb structure 100 includes a pillar-shaped honeycomb structure body 10. The honeycomb structure body 10 has porous partition walls 1 arranged to define a plurality of cells 2 extending from a first end face 11 to a second end face 12 to form through channels for a fluid, and a circumferential wall 20 disposed to surround the partition walls 1. The partition walls 1 have projecting portions 21 projecting to extend into the cells 2 and arranged continuously in an extending direction of the cells 2. Then, according to the honeycomb structure 100, in the cells 2 of 10% or more of the plurality of cells 2, the projecting portions 21 project toward the insides of the cells 2. Furthermore, in the honeycomb structure 100, a tip curvature radius R of an apex of each of the projecting portions 21 is from 0.01 to 0.1 mm. Additionally, in the honeycomb structure 100, side surfaces 22 of the projecting portions 21 are inclined to surfaces F of the partition walls 1 at an inclination angle θ of 40 to 70°. In addition, according to the honeycomb structure 100, a hydraulic diameter A of each cell 2 and a height H of the projecting portion 21 satisfy a relation of $0.04 \leq H/A \leq 0.4$. Furthermore, the cells 2 having the projecting portions 21 projecting into the cells 2 will occasionally be referred to as "specific cells".

The honeycomb structure 100 has the projecting portions 21 which are disposed to project into the cells 2 and which satisfy predetermined conditions. Consequently, in the honeycomb structure 100, it is possible to increase a geometric surface area of the partition walls 1. Furthermore, the projecting portions 21 satisfy the predetermined conditions, and hence, the catalyst can uniformly be loaded onto the surfaces of the partition walls. As a result, in the honeycomb structure 100, improvement of a purification performance is achievable, and it is further possible to inhibit rise of pressure loss.

(1-1) Projecting Portion:

In the honeycomb structure 100, the partition walls 1 have the projecting portions 21 as described above. Consequently, when the catalyst is loaded onto the honeycomb structure 100, by the increase amount of area of the projecting portions 21 a catalyst loading area of the honeycomb structure 100 in which the projecting portions 21 are disposed is larger than that of a honeycomb structure in which the projecting portions 21 are not disposed. As a result, contact properties of the catalyst with an exhaust gas improve, and the purification performance of the exhaust gas improves.

In the honeycomb structure 100, there are not any special restrictions on a ratio of specific cells 2a as long as all the cells include 10% or more of the specific cells. For example, the ratio of the specific cells 2a in all the cells 2 (a value calculated by a numerical formula: (the number of the specific cells 2a/a total number of the cells 2)×100) is preferably from 50 to 100% and further preferably from 60 to 80%. When the ratio of the specific cells 2a in all the cells 2 is in the above range, more suitable exhaust gas purification performance is exerted. When the ratio of the specific cells 2a in all the cells 2 is less than the above lower limit, there is the fear that the purification performance deteriorates. When the ratio is in excess of the upper limit, there is the fear that the pressure loss increases.

The tip curvature radius R of the apex of the projecting portion 21 is from 0.01 to 0.1 mm, preferably from 0.01 to 0.08 mm, and further preferably from 0.01 to 0.07 mm. When the tip curvature radius R is in the above range, the catalyst is also effectively loaded onto the tips of the apexes of the projecting portions 21. When the tip curvature radius R is less than the lower limit, the catalyst is hard to be loaded onto the tips of the apexes of the projecting portions 21. Furthermore, when the tip curvature radius R is in excess of the upper limit, a weight of the honeycomb structure 100 increases, and the purification performance deteriorates.

Figure 4:
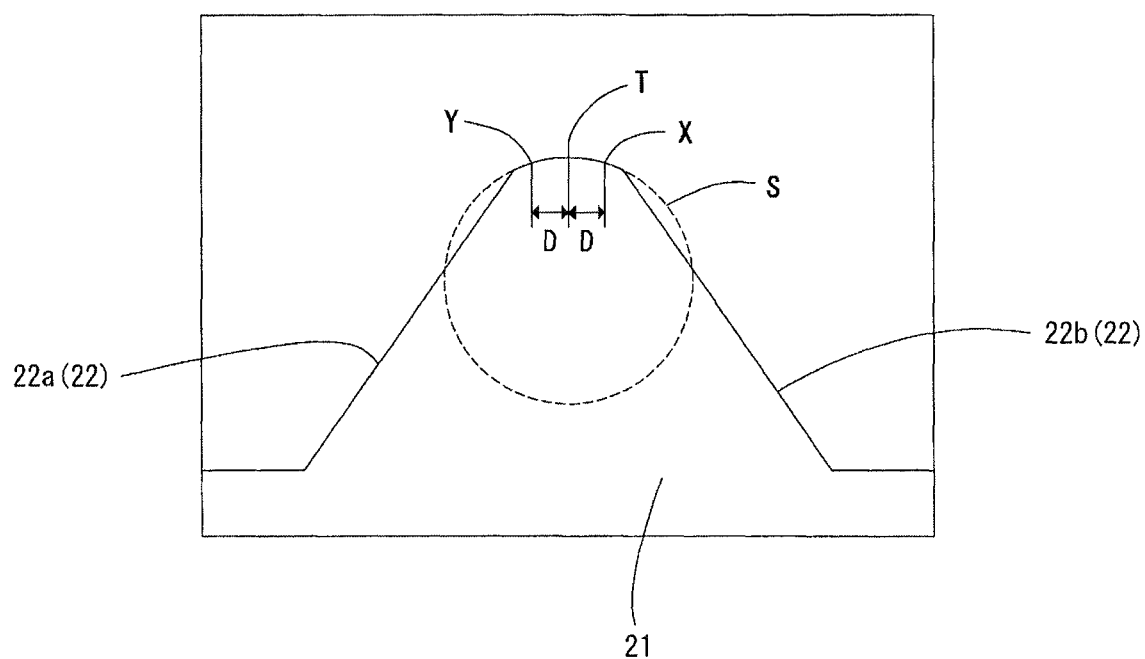
FIG. 4 is a plan view schematically showing an enlarged projecting portion in the embodiment of the honeycomb structure of the present invention.
Figure 5:
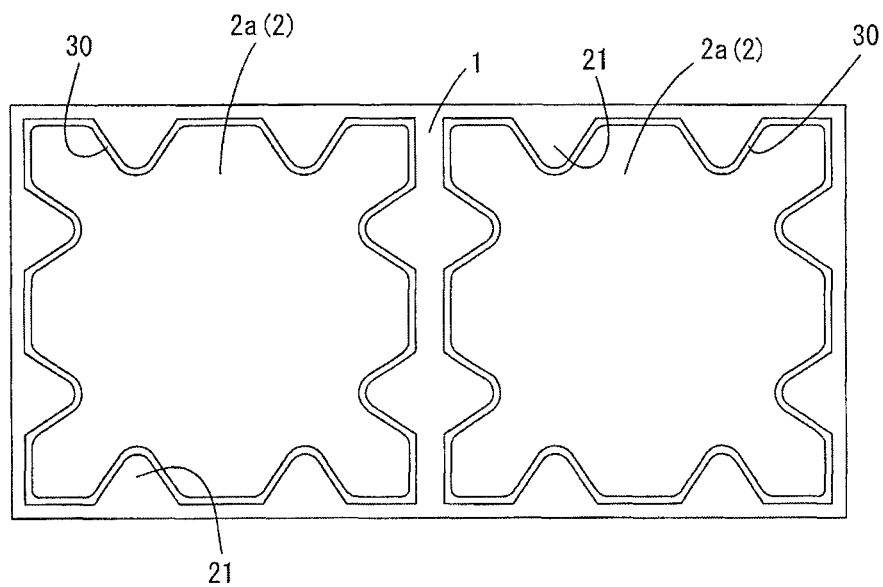
FIG. 5 is an enlarged plan view schematically showing a state where a catalyst is loaded in the embodiment of the honeycomb structure of the present invention.
Figure 6:
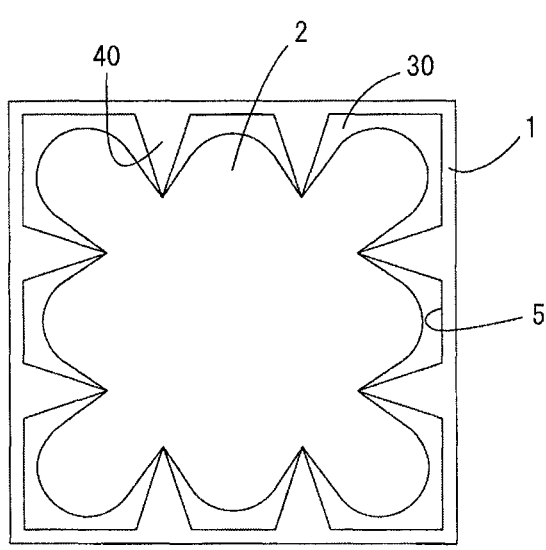
FIG. 6 is an enlarged plan view schematically showing a state where a catalyst is loaded in a conventional honeycomb structure.

In the present description, "the tip curvature radius R" is a value obtainable as follows. Initially, in a cross section perpendicular to a cell extending direction, points on side surfaces (one side surface 22a and the other side surface 22b) which are away as much as a distance D (5 μm) in a width direction from an apex T of the projecting portion 21 (the highest point of the projecting portion) are defined as a first measurement point X and a second measurement point Y (see FIG. 4). Then, when a circle S is drawn to pass through these three points (the apex T, the first measurement point X and the second measurement point Y), a radius of the drawn circle S is defined as the above "tip curvature radius R".

Specifically, a height of the projecting portion 21 can be from 0.05 to 0.3 mm. The heights of the respective projecting portions 21 may be the same or different. It is to be noted that the height of the projecting portion 21 is the shortest distance from the apex T of the projecting portion 21 (the highest point of the projecting portion 21) to a bottom side F (see FIG. 3) in the cross section perpendicular to the cell extending direction.

The side surfaces of the projecting portions 21 are inclined to the surfaces of the partition walls 1 at the inclination angle of 40 to 70°. It is preferable that the inclination angle θ is from 45 to 65°. When the inclination angle θ is in the above range, the catalyst is hard to thickly accumulate in roots of the projecting portions during coating with the catalyst (during the catalyst coating), a surface area coated with the catalyst can increase (after the catalyst coating), and the purification performance of the exhaust gas improves. When the inclination angle θ is less than the above lower limit and when the heights of the projecting portions 21 are adjusted to be the same while changing their angles, a volume of the projecting portions 21 increases. In consequence, a heat capacity of the honeycomb structure 100 increases, much time is therefore required until the catalyst reaches its activation temperature, and there is the fear that the purification performance of the exhaust gas deteriorates. When the inclination angle θ is in excess of the above upper limit, there is the fear that a lot of catalyst accumulates in the roots of the projecting portions 21 during the catalyst coating. In other words, there is the tendency that a thick layer of the catalyst (a catalyst layer) is formed in the roots of the projecting portions 21. Therefore, there is the fear that the catalyst of the lower layer portion of this catalyst layer (the portion closer to the partition wall) is not effectively used. Here, in the cross section perpendicular to the extending direction of the cells 2, the inclination angle θ is defined as an angle formed by a tangent line of each side surface of the projecting portion 21 at a position of ½ of the height of the projecting portion 21 and an extension line of the bottom side F (see FIG. 3). It is to be noted that the inclination angle θ is an acute angle in the angles formed by the surface of the partition wall 1 and the side surface of the projecting portion 21.

In the relation between the height H of the projecting portion 21 and the hydraulic diameter A of the cell 2, it is necessary to satisfy $0.04 \leq H/A \leq 0.4$. This relational expression is preferably $0.045 \leq H/A \leq 0.4$ and further preferably $0.05 \leq H/A \leq 0.035$. When the height H of the projecting portion 21 and the hydraulic diameter A of the cell 2 satisfy the above relation, it is possible to inhibit the increase of the pressure loss. When a ratio of the relation is less than the lower limit, a bag emission excessively increases, and a sufficient purification performance is not exerted. Furthermore, when the ratio is in excess of the upper limit, the pressure loss excessively increases.

The hydraulic diameter of the cell 2 is a value calculated by 4×(a sectional area)/(a peripheral length) on the basis of the sectional area and peripheral length of each cell. The sectional area of the cell 2 indicates an area of a shape (a sectional shape) of the cell which appears in a cross section of the honeycomb structure 100 which is vertical to a central axis direction, and the peripheral length of the cell 2 indicates a length of a periphery of the sectional shape of the cell 2 (a length of a closed line which surrounds the cross section).

There are not any special restrictions on a position at which the projecting portion 21 is to be formed. Specifically, the projecting portion 21 may be disposed to project from the surface of the partition wall 1, or may be disposed in an intersecting region where the partition walls of two sides constituting the peripheral edge of the cell 2 intersect. Furthermore, the projecting portions may be disposed at both of these positions. Here, in the case of disposing the same number of the projecting portions 21 in one cell 2, when at least one projecting portion 21 is disposed in the above intersecting region, it is possible to inhibit the increase of the pressure loss more than when the projecting portion 21 is not disposed in the above intersecting region.

When the projecting portions 21 are disposed to project from the surfaces of the partition walls 1, there are not any special restrictions on positions of the projecting portions. For example, the projecting portions 21 can be disposed to equally divide each partition wall 1. FIG. 3 shows an example where two projecting portions 21 are disposed on each partition wall 1 to divide the partition wall 1 into three equal parts.

There are not any special restrictions on the number of the projecting portions 21 to be disposed on each partition wall 1. For example, the number of the projecting portions 21 to be disposed on each partition wall 1 may be 3 or less. That is, in the specific cell 2a, it is preferable that the number of the projecting portions 21 to be disposed per side is 3 or less. In this case, it is possible to prevent the increase of the pressure loss.

There are not any special restrictions on a shape of the projecting portion 21 in the cross section perpendicular to the extending direction of the cells 2. Examples of the shape include a triangular shape, a semicircular shape, and a semi-elliptic shape. Among these examples, the triangular shape is preferable. In the triangular shape, the catalyst is uniformly loaded, and the heat capacity of the honeycomb structure decreases. Therefore, the time required until the catalyst reaches its activation temperature shortens, and the purification performance improves.

In a preferable configuration, the projecting portions 21 are disposed in a central portion of the honeycomb structure body 10 which excludes a circumferential portion of a region of 5 mm from a circumference of the honeycomb structure body 10. When the projecting portions 21 are disposed in the central portion of the honeycomb structure body 10 in this manner, it is possible to inhibit the increase of the pressure loss while improving the purification performance of the exhaust gas. "The central portion of the honeycomb structure body 10" is a region excluding the circumferential portion of the region of 5 mm from the circumference of the honeycomb structure body 10. In other words, it is preferable that the projecting portions 21 are disposed only in the above central portion and are not disposed in the circumferential portion that is the region of 5 mm from the circumference of the honeycomb structure body 10. It is to be noted that in the present configuration, the projecting portions 21 may be disposed in the above central portion, and the projecting portions may be disposed in the whole central portion or a part of the central portion.

Furthermore, in another preferable configuration, the projecting portions 21 are disposed in the whole region of the honeycomb structure body 10 (i.e., a region of the circumferential portion combined with the central portion). In other words, it is preferable that the projecting portions 21 are disposed in all the cells 2 of the whole region of the honeycomb structure body 10. When the projecting portions 21 are disposed in this manner, the purification performance of the exhaust gas further improves.

A thickness of the partition walls 1 is preferably from 40 to 230 μm and further preferably from 40 to 173 μm. When the thickness of the partition walls 1 is less than the lower limit, there is the fear that a mechanical strength runs short. When the thickness of the partition walls 1 is in excess of the upper limit, there is the fear that the pressure loss of the honeycomb structure 100 rises. It is to be noted that the thickness of the partition walls 1 is a value obtained by measuring a thickness of a portion in which the projecting portions 21 are not disposed.

There are not any special restrictions on a material of the partition walls 1. For example, it is preferable that the material contains ceramic as a main component. Specifically, it is preferable that the material is at least one selected from the group consisting of silicon carbide, a silicon-silicon carbide based composite material, cordierite, mullite, alumina, aluminum titanate, silicon nitride, and a silicon carbide-cordierite based composite material.

Specifically, examples of a shape of the cell 2 include polygonal shapes such as a triangular shape, a quadrangular shape, a pentagonal shape, a hexagonal shape and an octagonal shape, a round shape, an elliptic shape, and any combination of the quadrangular shape with the hexagonal shape, the octagonal shape and the like. It is to be noted that in the present description, "the shape of the cell 2" means a shape of the cell in which the projecting portions 21 are not disposed. Furthermore, "the polygonal shape of the cell 2" is a concept of the shape of the cell 2 including a shape which conforms to the polygonal shape.

(1-2) Circumferential Wall:

The circumferential wall 20 is a wall disposed to surround the partition walls 1. The circumferential wall 20 may be formed monolithically with the partition walls 1.

A thickness of the circumferential wall 20 is preferably from 0.1 to 0.6 mm and especially preferably from 0.1 to 0.3 mm. When the thickness of the circumferential wall 20 is less than the lower limit, the mechanical strength might deteriorate. When the thickness is in excess of the upper limit, a large space to store the honeycomb structure occasionally has to be acquired.

A cell density of the honeycomb structure 100 is preferably from 31 to 155 cells/cm$^2$ and especially preferably from 43 to 148 cells/cm$^2$. When the cell density is less than the lower limit, there is the fear that the strength cannot be kept. When the cell density is in excess of the upper limit, there is the fear that the pressure loss of the honeycomb structure 100 rises.

(2) Manufacturing Method of Honeycomb Structure:

The honeycomb structure of the present invention can be manufactured by a method having a honeycomb forming step and a firing step. Hereinafter, description will be made as to each step.

(2-1) Honeycomb Forming Step:

In the present step, a ceramic forming raw material containing a ceramic raw material is formed, to form a honeycomb formed body having partition walls arranged to define a plurality of cells which form through channels for a fluid.

It is preferable that the ceramic raw material contained in the ceramic forming raw material is at least one selected from the group consisting of a cordierite forming raw material, cordierite, silicon carbide, a silicon-silicon carbide based composite material, mullite, and aluminum titanate. It is to be noted that the cordierite forming raw material is a ceramic raw material blended to obtain a chemical composition in which silica falls in a range of 42 to 56 mass %, alumina falls in a range of 30 to 45 mass %, and magnesia falls in a range of 12 to 16 mass %. Then, the cordierite forming raw material is fired to form cordierite.

Furthermore, the ceramic forming raw material can be prepared by mixing the above ceramic raw material with a dispersing medium, an organic binder, an inorganic binder, a pore former, a surfactant and the like. There are not any special restrictions on a composition ratio of each raw material, and it is preferable to set the composition ratio in accordance with a structure, a material and the like of the honeycomb structure to be prepared.

In the case of forming the ceramic forming raw material, the ceramic forming raw material is initially kneaded to obtain a kneaded material, and the obtained kneaded material is formed in a honeycomb shape. An example of a method of kneading the ceramic raw material to form the kneaded material can include a method of using a kneader, a vacuum pugmill or the like. As a method of forming the kneaded material to obtain a honeycomb formed body, for example, a known forming method such as an extrusion molding or an injection molding is usable.

Specifically, a suitable example of the method can include a method of extruding the material by use of a die to form the honeycomb formed body. As a material of the die, cemented carbide which is hard to be worn is preferable.

It is preferable to use the die prepared as follows. That is, there is initially prepared a die (a conventional die) for use in preparing a heretofore known honeycomb structure which does not have any fins. Afterward, there are formed regions which are complementary to projecting portions (the regions into which the kneaded material enters to form the projecting portions), from slits of this conventional die (gaps to constitute partition walls) toward the outside by discharge processing. In this way, a predetermined die can be prepared.

By use of such a die, it is possible to simply prepare the honeycomb formed body having projecting portions which satisfy conditions of the honeycomb structure of the present invention.

There are not any special restrictions on a shape of the honeycomb formed body, and examples of the shape can include a round pillar shape, an elliptic pillar shape, and a polygonal prismatic columnar shape in which each end face has "a square shape, a rectangular shape, a triangular shape, a pentagonal shape, a hexagonal shape, an octagonal shape or the like".

Furthermore, the obtained honeycomb formed body can be dried after the honeycomb formed body is formed as described above. There are not any special restrictions on a drying method. Examples of the drying method can include a hot air drying, a microwave drying, an induction drying, drying under a reduced pressure, a vacuum drying, and a freeze drying. Among these examples, it is preferable to perform one or any combination of the induction drying, the microwave drying and the hot air drying.

(2-2) Firing Step:

Next, the honeycomb formed body is fired to prepare a honeycomb fired body. The firing of the honeycomb formed body (main firing) is performed for the purpose of sintering and densifying the forming raw material constituting a calcinated honeycomb formed body and acquiring a predetermined strength. Firing conditions (a temperature, a time, atmosphere and the like) vary in accordance with a type of forming raw material, and hence, appropriate conditions may be selected in accordance with the type. For example, when the cordierite forming raw material is used, it is preferable that a firing temperature is from 1410 to 1440° C. Furthermore, it is preferable that the firing time is from 4 to 8 hours as a time to keep the highest temperature. As a device which performs calcinating and main firing, an electric furnace, a gas furnace or the like is usable. The honeycomb fired body obtained as described above can be the honeycomb structure of the present invention. It is to be noted that the manufacturing method of the honeycomb structure may further have a circumference coating step as follows.

(2-3) Circumference Coating Step:

In the present step, a circumference of the obtained honeycomb fired body is coated with a circumference coating material to form a circumferential wall. It is to be noted that the circumferential wall may be formed monolithically with the partition walls during the preparation of the honeycomb formed body. The circumferential wall is further formed in the circumference coating step, so that it is possible to prevent the honeycomb structure from being chipped when an external force is applied to the honeycomb structure.

An example of the circumference coating material can include a material obtained by adding additives such as an organic binder, a foamable resin and a dispersing agent to inorganic raw materials such as inorganic fibers, colloidal silica, clay and SiC particles, and adding water to the materials to knead the materials. An example of a coating method with the circumference coating material can include a method of coating "the cut honeycomb fired body" with the material by use of a rubber spatula or the like while rotating the cut honeycomb fired body on a potter's wheel.

EXAMPLES

Hereinafter, the present invention will further specifically be described with reference to examples, but the present invention is not limited to these examples.

Example 1

In Example 1, a forming raw material to prepare a honeycomb structure was initially prepared. Specifically, a binder, a surfactant, a pore former and water were added to a ceramic raw material to obtain a forming raw material. Additionally, as the ceramic raw material, cordierite forming raw materials such as kaolin, talc and alumina were used.

Next, the obtained forming raw material was kneaded with a kneader and then kneaded with a vacuum pugmill, to prepare a kneaded material. Then, the obtained kneaded material was extruded by using a die, to prepare a honeycomb formed body. There was used the die in which regions complementary to projecting portions (regions into which the kneaded material entered to form the projecting portions) were formed. The honeycomb formed body was prepared so that a thickness of partition walls was 0.09 mm and a cell density was 62 cells/cm$^2$ after the honeycomb formed body was fired. A shape of each cell of the honeycomb formed body was quadrangular. The honeycomb formed body had a round pillar shape. A diameter of each end face of the round pillar-shaped honeycomb formed body was 103 mm after the honeycomb formed body was fired. Furthermore, a length of the honeycomb formed body in a cell extending direction was 84 mm after the honeycomb formed body was fired. Additionally, the above die was designed so that the honeycomb structure to be prepared satisfied respective conditions shown in Table 1 and Table 2.

Afterward, the honeycomb formed body was dried, to obtain a honeycomb dried body. During the drying, a microwave drying was initially performed, and then, a hot air drying was performed with hot air at a temperature of 120° C. for 2 hours. Next, both end portions of the honeycomb dried body were cut.

Next, the obtained honeycomb dried body was degreased. The degreasing was performed at 450° C. for 5 hours. Then, the degreased honeycomb dried body was fired, to obtain a honeycomb fired body. The firing was performed at 1425° C. in the atmospheric air for 7 hours. Additionally, a temperature was raised from 1200 to 1425° C. in 5 hours. In this way, the honeycomb structure of Example 1 was prepared.

In the obtained honeycomb structure, as shown in FIG. 3, two projecting portions projected from each partition wall of a cell having a quadrangular sectional shape, and eight projecting portions in total were formed in the cell. In this honeycomb structure, a tip curvature radius R was 0.01 mm. Furthermore, a height H of each of the projecting portions was 0.14 mm and a hydraulic diameter A of each cell was 0.90 mm. Then, a value of a ratio H/A (the height H of the projecting portion/the hydraulic diameter A of the cell) was 0.16. Additionally, as to all the projecting portions of the obtained honeycomb structure, side surfaces of the projecting portions had an inclination angle of 45° to the surfaces of the partition walls. Furthermore, all the projecting portions were arranged continuously without being interrupted in their middles from a first end face to a second end face. Additionally, all the projecting portions were formed on sides of the partition walls which defined specific cells (each of Table 1 and Table 2 shows "a side portion" in a column of "a position at which the projecting portion is formed"). Additionally, in Example 11, all projecting portions were formed in corners of specific cells (each of Table 1 and Table 2 shows "a corner portion" in a column of "the position at which the projecting portion is formed"). The obtained honeycomb structure had the same shape as an inverted shape of the shape of the above die.

Additionally, the inclination angle θ of the projecting portion and the height H of the projecting portion were measured by using a profile projector (manufactured by Mitutoyo Corporation) and an image analysis software (manufactured by Mitutoyo Corporation). Furthermore, positions of the projecting portions on the sides were confirmed. Specifically, an end face of the honeycomb structure was initially photographed with the profile projector to obtain an image, binarization of the image was then performed, and the above measurement and the confirmation were performed by using a measuring function of the image analysis software.

Furthermore, a ratio of the specific cells to all the cells was 50% (each of Table 1 and Table 2 shows this ratio in a column of "the ratio of the specific cells"). Specifically, this ratio was calculated as follows. That is, one honeycomb structure was initially photographed with the profile projector to obtain an image, and the number of all the cells and the number of all the specific cells were counted in the honeycomb structure of the image.

Furthermore, as to the prepared honeycomb structure, by use of the above profile projector and the image analysis software, a partition wall thickness (mm), a cell density (cells/cm$^2$), a hydraulic diameter (mm) of the cell, a tip curvature radius of the projecting portion and an inclination angle of the projecting portion were measured. Table 1 and Table 2 show the results.

TABLE 1

|  | Comparative Example 1 | Example 1 | Example 2 | Comparative Example 2 | Comparative Example 3 | Example 3 | Example 4 | Comparative Example 4 | Comparative Example 5 | Example 5 | Example 6 | Comparative Example 6 |
|---|---|---|---|---|---|---|---|---|---|---|---|---|
| Partition wall thickness (mm) | 0.09 | 0.09 | 0.09 | 0.09 | 0.09 | 0.09 | 0.09 | 0.09 | 0.09 | 0.09 | 0.09 | 0.09 |
| Cell density (cells/cm$^2$) | 62 | 62 | 62 | 62 | 62 | 62 | 62 | 62 | 62 | 62 | 62 | 62 |
| Height H of projecting portion (mm) | 0.14 | 0.14 | 0.14 | 0.14 | 0.14 | 0.14 | 0.14 | 0.14 | 0.03 | 0.05 | 0.26 | 0.27 |
| Hydraulic diameter A of cell (mm) | 0.90 | 0.90 | 0.90 | 0.90 | 0.90 | 0.90 | 0.90 | 0.90 | 1.18 | 1.12 | 0.66 | 0.64 |
| No. of projecting portions (projecting portions/cell) | 8 | 8 | 8 | 8 | 8 | 8 | 8 | 8 | 12 | 8 | 8 | 8 |
| Tip curvature radius R (mm) | 0.009 | 0.01 | 0.1 | 0.11 | 0.025 | 0.025 | 0.025 | 0.025 | 0.025 | 0.025 | 0.025 | 0.025 |
| Inclination angle (°) | 45 | 45 | 45 | 45 | 39 | 40 | 70 | 71 | 45 | 45 | 45 | 45 |
| H/A | 0.16 | 0.16 | 0.16 | 0.16 | 0.16 | 0.16 | 0.16 | 0.16 | 0.03 | 0.04 | 0.39 | 0.42 |
| Ratio of specific cells (%) | 50 | 50 | 50 | 50 | 50 | 50 | 50 | 50 | 50 | 50 | 50 | 50 |
| Position at which projecting portion is formed | Side portion | Side portion | Side portion | Side portion | Side portion | Side portion | Side portion | Side portion | Side portion | Side portion | Side portion | Side portion |
| Region where specific cell is disposed | Central portion | Central portion | Central portion | Central portion | Central portion | Central portion | Central portion | Central portion | Central portion | Central portion | Central portion | Central portion |
| Pressure loss (kPa) | 1.74 | 1.74 | 1.99 | 2.02 | 1.87 | 1.85 | 1.57 | 1.56 | 1.06 | 1.11 | 1.95 | 2.01 |
| Judgment of pressure loss | OK | OK | OK | NG | OK | OK | OK | OK | OK | OK | OK | NG |
| Bag emission (g/mile) | 0.020 | 0.018 | 0.015 | 0.024 | 0.021 | 0.018 | 0.016 | 0.027 | 0.021 | 0.019 | 0.018 | 0.017 |
| Judgment of Bag emission | NG | OK | OK | NG | NG | OK | OK | NG | NG | OK | OK | OK |
| General judgment | NG | OK | OK | NG | NG | OK | OK | NG | NG | OK | OK | NG |

TABLE 2

|  | Example 7 | Comparative Example 7 | Example 8 | Example 9 | Example 10 | Example 11 |
|---|---|---|---|---|---|---|
| Partition wall thickness (mm) | 0.09 | 0.09 | 0.09 | 0.09 | 0.09 | 0.09 |
| Cell density (cells/cm$^2$) | 62 | 62 | 62 | 62 | 62 | 62 |
| Height H of projecting portion (mm) | 0.05 | 0.14 | 0.14 | 0.14 | 0.14 | 0.14 |
| Hydraulic diameter A of cell (mm) | 1.13 | 0.90 | 0.90 | 0.90 | 0.90 | 1.39 |
| No. of projecting portions (projecting portions/cell) | 16 | 8 | 8 | 8 | 8 | 8 |
| Tip curvature radius R (mm) | 0.025 | 0.025 | 0.025 | 0.025 | 0.025 | 0.025 |
| Inclination angle (°) | 45 | 45 | 45 | 45 | 45 | 45 |
| H/A | 0.04 | 0.16 | 0.16 | 0.16 | 0.16 | 0.10 |
| Ratio of specific cells (%) | 80 | 9 | 80 | 80 | 100 | 80 |
| Position at which projecting portion is formed | Side portion | Side portion | Side portion | Side portion | Side portion | Corner portion |
| Region where specific cell is disposed | Whole region | Central portion | Whole region | Central portion | Whole region | Central portion |
| Pressure loss (kPa) | 1.89 | 1.30 | 1.75 | 1.70 | 1.74 | 1.38 |
| Judgment of pressure loss | OK | OK | OK | OK | OK | OK |
| Bag emission (g/mile) | 0.014 | 0.030 | 0.018 | 0.016 | 0.018 | 0.018 |
| Judgment of Bag emission | OK | NG | OK | OK | OK | OK |
| General judgment | OK | NG | OK | OK | OK | OK |

(Pressure Loss)

As to the prepared honeycomb structure, the pressure loss was measured by using a large wind tunnel tester. At this time, a gas temperature was set to 25° C. and a gas flow rate was set to 10 Nm$^3$/min. In evaluation criteria, the pressure loss of 2.00 kPa or less was evaluated as "OK" and the pressure loss in excess of 2.00 kPa was evaluated as "NG". This is because outputs deteriorate when the pressure loss is in excess of 2.00 kPa.

(LA-4 Test)

As to the prepared honeycomb structure, a test based on LA-4 mode of US federal test procedure was carried out as follows. Initially, a catalyst (a three-way catalyst) was loaded as much as 200 g/L onto the partition walls of the honeycomb structure. Then, an aging treatment of the honeycomb structure onto which the catalyst was loaded was carried out at 950° C. for 12 hours by use of an electric furnace. Next, the honeycomb structure onto which the catalyst was loaded was mounted at a position under a floor of a vehicle having a displacement of 2400 cc, to carry out a LA-4 test. In the LA-4 test, a direct modal mass of each exhaust gas component was measured by using an exhaust gas measuring device (model No. "MEXA-7400" manufactured by HORIBA, Ltd.). Furthermore, an amount of HC to be emitted as a typical exhaust gas component was measured. Additionally, a space velocity of the exhaust gas in this test was about 10000 (1/hour) (a high flow rate).

(Judgment of Bag Emission)

In a bag emission, when an amount of HC to be emitted was 0.019 g/mile or less, a judgment result was "OK", and when the amount was in excess of 0.019 g/mile, the judgment result was "NG". It is to be noted that when the result of the present evaluation is "OK", it is considered that the catalyst is uniformly coated and is therefore effectively utilized in purification of the exhaust gas, and hence, the purification performance improves.

(General Judgment)

General judgment was carried out in accordance with the following criteria on the basis of the evaluation of the pressure loss and the judgment of the LA-4 test. A case where both results of the evaluation of the pressure loss and the evaluation of the LA-4 test were "OK" was evaluated as "OK", and the other cases were evaluated as "NG".

Examples 2 to 11 and Comparative Examples 1 to 7

The procedure of Example 1 was repeated except that projecting portions were formed as shown in Table 1 and Table 2, to prepare honeycomb structures.

Also as to the honeycomb structures of Examples 2 to 11 and Comparative Examples 1 to 7, the procedure of Example 1 was repeated to evaluate a pressure loss and carry out a LA-4 test. Table 1 and Table 2 show the results.

(Result)

As shown in Table 1 and Table 2, it is seen that in each of the honeycomb structures of Examples 1 to 11, a pressure loss is lower and a purification performance of an exhaust gas is higher than in the honeycomb structures of Comparative Examples 1 to 7.

A honeycomb structure of the present invention is utilizable as an exhaust gas purifying catalyst carrier to purify an exhaust gas.

DESCRIPTION OF REFERENCE NUMERALS

1: partition wall, 2: cell, 2a: specific cell, 5: surface of the partition wall, 10: honeycomb structure body, 11: first end face, 12: second end face, 20: circumferential wall, 21: projecting portion, 22: side surface of the projecting portion, 22a: one side surface of the projecting portion, 22b: the other side surface of the projecting portion, 30: catalyst, 40: fin, and 100: honeycomb structure.

What is claimed is:

1. A honeycomb structure comprising:
a pillar-shaped honeycomb structure body having porous partition walls arranged to define a plurality of cells extending from a first end face to a second end face to form through channels for a fluid, and a circumferential wall disposed to surround the partition walls,
wherein the partition walls have projecting portions projecting to extend into the cells and arranged continuously in an extending direction of the cells,
the projecting portions project into 10% or more of the plurality of cells,
a tip curvature radius R of an apex of each of the projecting portions is from 0.01 to 0.1 mm,
side surfaces of the projecting portions are inclined to the surfaces of the partition walls at an inclination angle of 40 to 70°, and
a hydraulic diameter A of each cell and a height H of the projecting portion satisfy a relation of $0.04 \leq H/A \leq 0.4$.

2. The honeycomb structure according to claim 1, wherein in the partition walls arranged to define the cells, the number of the projecting portions to be disposed per side constituting a peripheral edge of the cell is 3 or less.

3. The honeycomb structure according to claim 1, wherein the projecting portions are disposed in a central portion of the honeycomb structure body excluding a circumferential portion of a region of 5 mm from a circumference of the honeycomb structure body.

4. The honeycomb structure according to claim 1, wherein the projecting portions are disposed in a whole region of the honeycomb structure body.

5. The honeycomb structure according to claim 1, wherein the projecting portions are disposed in an intersecting region where the partition walls of two sides constituting a peripheral edge of the cell intersect.

* * * * *